(12) United States Patent
Arena et al.

(10) Patent No.: US 7,401,037 B2
(45) Date of Patent: Jul. 15, 2008

(54) SYSTEM, METHOD, AND COMPUTER PROGRAM PRODUCT FOR PROVIDING STABILIZED ANNUITY PAYMENTS AND CONTROL OF INVESTMENTS IN A VARIABLE ANNUITY

(75) Inventors: Robert Arena, Farmington, CT (US); Robert Schwartz, West Granby, CT (US); N David Kuperstock, Woodbridge, CT (US); Robert O'Donnell, Harwinton, CT (US); Gordon Boronow, Trumbull, CT (US)

(73) Assignee: The Prudential Insurance Company of America, Newark, NJ (US)

( * ) Notice: Subject to any disclaimer, the term of this patent is extended or adjusted under 35 U.S.C. 154(b) by 1263 days.

(21) Appl. No.: 10/079,795

(22) Filed: Feb. 20, 2002

(65) Prior Publication Data

US 2002/0184129 A1 Dec. 5, 2002

Related U.S. Application Data

(60) Provisional application No. 60/269,797, filed on Feb. 20, 2001.

(51) Int. Cl.
*G06Q 40/00* (2006.01)
(52) U.S. Cl. .................................. 705/35; 705/36 R
(58) Field of Classification Search ............. 705/35
See application file for complete search history.

(56) References Cited

U.S. PATENT DOCUMENTS

| | | | | |
|---|---|---|---|---|
| 4,953,085 A | * | 8/1990 | Atkins ...................... 705/36 R |
| 5,126,936 A | | 6/1992 | Champion et al. |
| 5,291,398 A | | 3/1994 | Hagan ........................ 364/408 |
| 5,631,828 A | | 5/1997 | Hagan |
| 5,754,980 A | | 5/1998 | Anderson et al. ............. 705/14 |
| 5,812,987 A | | 9/1998 | Luskin et al. |
| 5,852,811 A | * | 12/1998 | Atkins ...................... 705/36 R |
| 5,893,071 A | | 4/1999 | Cooperstein ................... 705/4 |

(Continued)

OTHER PUBLICATIONS

IL Annuity & Insurance Co Separate Account 1; 485BPOS IL Annuity and Insurance Form N-4 Post-Effective; File No. 033-089028; GSI; Livedgar Information Provided by Global Securities Information, Inc., pp. 1 to 99, Apr. 26, 1996.

(Continued)

*Primary Examiner*—James P. Trammell
*Assistant Examiner*—J. Bradley Wright
(74) *Attorney, Agent, or Firm*—Baker Botts L.L.P.

(57) ABSTRACT

In one embodiment, a method of managing assets for stabilizing anticipated periodic payments, allocating the assets to first and second pools; at periodic intervals, comparing the current value of the assets in the first pool to a present value of the remaining payments; and, when the current value is less the present value, reallocating a portion of the assets from the second pool to the first pool so that the first asset pool has a current value representing the present value. In another embodiment, a method for managing assets for stabilizing anticipated periodic payments includes allocating the assets into first and second pools; establishing a first payment amount; determining a first trigger value; assessing a current value of the assets; and reallocating assets from the second pool to the first pool to increase the first payment amount in response to the current value being greater than the first trigger value.

4 Claims, 4 Drawing Sheets

U.S. PATENT DOCUMENTS

| | | | |
|---|---|---|---|
| 5,893,078 A * | 4/1999 | Paulson | 705/35 |
| 5,933,815 A | 8/1999 | Golden | |
| 6,064,969 A | 5/2000 | Haskins | 705/4 |
| 6,064,986 A | 5/2000 | Edelman | 705/36 |
| 6,219,650 B1 | 4/2001 | Friend et al. | |
| 6,253,192 B1 | 6/2001 | Corlett et al. | 706/36 |
| 6,275,807 B1 | 8/2001 | Schirripa | 705/4 |
| 6,278,983 B1 | 8/2001 | Ball | |
| 6,343,272 B1 | 1/2002 | Payne et al. | 705/4 |
| 6,386,444 B1 * | 5/2002 | Sullivan | 235/379 |
| 6,415,267 B1 | 7/2002 | Hagan | 705/35 |
| 6,592,030 B1 | 7/2003 | Hardesty | 235/380 |
| 6,611,808 B1 | 8/2003 | Preti et al. | 705/4 |
| 6,611,815 B1 | 8/2003 | Lewis et al. | |
| 6,615,180 B1 | 9/2003 | Anderton, deceased et al. | 705/4 |
| 7,016,871 B1 * | 3/2006 | Fisher et al. | 705/35 |
| 7,089,201 B1 * | 8/2006 | Dellinger et al. | 705/35 |
| 2001/0014873 A1 | 8/2001 | Henderson et al. | |
| 2002/0035527 A1 * | 3/2002 | Corrin | 705/35 |
| 2002/0035532 A1 * | 3/2002 | Halpern | 705/36 |
| 2002/0103733 A1 * | 8/2002 | Barrington et al. | 705/35 |
| 2002/0194098 A1 * | 12/2002 | Stiff et al. | 705/36 |
| 2003/0120570 A1 * | 6/2003 | Dellinger et al. | 705/35 |
| 2006/0282363 A1 * | 12/2006 | Tarbox et al. | 705/35 |

OTHER PUBLICATIONS

Manufacturers Life Insurance Co USA Separate Account H; 485APOS; The Manufacturers Life Insurance Company; GSI; Livedgar Information provided by Global Securities Information, Inc., pp. 1 to 161, Mar. 1, 1999.

Manulife Financial, "Venture Combination Fixed and Variable Annuity," Financial Planning Resources, Inc., 4 pages, Jul. 1999.

White Paper, "Manulife Offers Payout Floor on Variables," Best's Review—Life-Health Insurance Edition, BestWire, 1 Page, Jul. 20, 1998.

GSI, "Variable Annuity Account B of ING Life Ins & Annuity Co," 485BPOS, Aetna Life Insurance and Annuity Company Form N-4, www.gsionline.com, Livedgar® Information Provided by Global Securities Information, Inc., 25 pages, As filed w/SEC on Nov. 24, 1999.

* cited by examiner

SYSTEM, METHOD, AND COMPUTER PROGRAM PRODUCT FOR PROVIDING STABILIZED ANNUITY PAYMENTS AND CONTROL OF INVESTMENTS IN A VARIABLE ANNUITY

CROSS REFERENCE TO RELATED APPLICATION

This non-provisional application claims the benefit of the earlier filing date of, and contains subject matter related to that disclosed in, U.S. Provisional Application Serial No. 60/269,797, filed Feb. 20, 2001 having common inventorship, the entire contents of which are incorporated herein by reference.

BACKGROUND OF THE INVENTION

1. Field of the Invention

This invention relates to the field of investment management and, in particular, to a system, method and computer program product for providing stabilized annuity payments and control of investments in a variable annuity.

2. Description of Related Art

A continuing challenge of investment management is to provide options that match an investor's objectives. In retirement, investors often need to receive a stream of periodic payments from their investments in order to pay their living expenses.

Annuities are a common form of investment vehicle for providing the stream of payments. An annuity is funded with an initial principal amount, commonly termed a contract amount. Periodic payments are provided to the annuitant, based on the contract amount, and the number of payments that are anticipated to be made from this annuity. Annuities are available in many forms. The distributions may be made for a predetermined definite period, as in an annuity certain, or for as long as the person lives, as in a life annuity. Payments under a life annuity may terminate on the annuitant's death, as in a straight life annuity, or may continue to a beneficiary for a specified period after the annuitant's death, as in a life annuity with period certain. The payments under an annuity may be set to begin one payment after purchase of the annuity, as in an immediate annuity, or after a specified amount of time, as in a deferred annuity. Finally, the cash value of an annuity is the commuted value of benefits payable irrespective of whether the annuitant is still alive.

As with most investments, there are risks associated with annuities. In a life annuity, in which payments are made until the death of the annuitant, there is a risk to the entity providing the annuity that the annuitant will live longer than anticipated, which results in a reduction in the amount of periodic payments driven by a continuing reduction of the principal amount to provide these payments. In a life annuity, there is also a risk to the investor of the annuitant living a lesser time than anticipated and not receiving a sufficient number of payments to have justified the initial investment.

These risks are further compounded by the risks associated with future economies. In a booming economy, the principal amount may provide a return-on-investment that exceeds the rate at which the periodic payments diminish the principal amount. In an inflationary economy, the value of the periodic payments may be insufficient to meet the intended need for these payments. Similarly, in a depressed economy, the return-on-investment may not be sufficient to match the rate at which the periodic payments diminish the principal amount.

In a conventional fixed life annuity plan, the provider or guarantor of the annuity plan assumes most of the long-term risks. The annuitant is guaranteed a level payment amount for the duration of the annuitant's life or, if there are multiple annuitants, for the duration of the annuitants' lives. If the guarantor is able to invest the contract amount at a higher rate-of-return than the rate-of-depletion of the principal by the periodic payments, the guarantor earns a profit. If the annuitant dies before the principal is depleted, the guarantor also earns a profit. If the principal is depleted before the annuitant dies, the subsequent periodic payments are borne by the guarantor, at a loss to the guarantor. Fundamentally, a fixed annuity alleviates the investor of the risk of outliving the source of income from the investment. For ease of reference, the terms investor and annuitant are used herein interchangeably, although it is recognized that one person, the investor, may purchase an annuity for another, the annuitant.

Although the typical investor might desire to shift the long-term risk to the guarantor via a fixed annuity plan, the investor is typically unwilling to assume the risk of losing the investment based on the short-term risk of dying prematurely. In other words, in a fixed life annuity, when the investor dies, the investor's beneficiaries are deprived of the investment amount, which they would have received if the annuity had not been purchased. To increase the marketability of a fixed life annuity, conventional fixed annuity plans offer a guaranteed minimum payment amount and duration (sometimes referred to as certain period or inheritance period), independent of the annuitant's life, to offset this reluctance on the part of the investor to assume the short-term risk of a loss of investment. If the annuitant dies prematurely, the guarantor continues to provide the guaranteed number of payments to the beneficiaries of the annuitant.

A fixed annuity, however, does not protect an investor from the long-term risk of inflation causing the periodic payments to lose purchasing value. To offset this risk, some conventional annuity plans offer a guaranteed payment amount that is dependent upon an annually determined inflation rate. To offset the assumption of this additional risk, the initial payment amounts are generally slightly less than the payment amounts of a conventional fixed life annuity plan.

In both the fixed life annuity and the annuity with inflation protection, the guarantor assumes the long-term risks, and, correspondingly, enjoys the benefits of any long-term gains. A typical annuity may be based, for example, on an effective annual interest rate of five percent (5%). If the guarantor is able to earn a long-term return-on-investment of eight percent (8%), this additional three percent (3%) is profit to the guarantor. Because of the relatively low guaranteed interest rate provided by a fixed annuity, compared to potential rates of return on investments, relatively few fixed annuity plans are sold during periods of high investment return potential.

To offset the loss of sales in fixed annuities during periods of economic growth, insurance companies and other institutions offer variable annuity plans. In a variable annuity plan, the investor chooses among a variety of investment options, such as mutual funds, and the periodic payment generally is based on the current value of each of the selected options. As such, the investor assumes the long-term market risks, and the provider of the annuity provides administrative services. In a conventional variable annuity, the payment amount is adjusted periodically, based on the current value of the investment.

Because the investor assumes all of the risks, all of the gains realized by a favorable market, if any, are credited to the investor. Correspondingly, all losses, if any, are deducted from the investor's principal. The periodic payments will vary depending upon increase or decrease in the value of the investments. The investor assumes the long-term risk of diminishing the principal to such an extent that the periodic payments are substantially decreased, and also assumes the short-term risk of reduced payments during periods of a depressed market. In a rapidly changing economy, the fluctuation in payment amounts can be disconcerting or, more significantly, may not provide the amount required to meet the needs for which the annuity was established.

Hybrid variable-rate annuities are available, at an additional cost to the investor, wherein the annuity is guaranteed not to decrease below a minimum payment amount. In such a plan, the guarantor is assuming some of the long-term risk in return for the additional cost to the investor. In a hybrid variable-rate annuity, the minimum payment amount is often substantially lower than the payment amount that is provided in periods of high investment return. The minimum payment amount provides a 'floor' below which the periodic payment will not drop, but having this floor does not eliminate the fluctuations in payment amounts that are based on the current profits or losses provided by the investment.

The fluctuations in payment amounts can be controlled somewhat by 'filtering' the present investment value that is used to determine the annuity payments. For example, a running average of the present value of the investment may be used to eliminate very short-term peaks and dips from the value used to determine the annuity payments. Generally, however, a running average "lags" the present investment value such that general increases or decreases are not immediately reflected in the running average. Hence, the increase or decrease in the annuity payment is delayed relative to the actual increase or decrease in the investment value. This can be particularly problematic, however, when investments are performing poorly, which results in the annuity payments being higher than the actual investment value warrants, thereby depleting the investment more quickly than the rate that the investment value can actually sustain.

Therefore, notwithstanding the available annuity products and options, there is a need for a system, method, and computer program product for providing stabilized annuity payments and control of investments in a variable annuity: (1) that can provide a cushion against market volatility, maintaining stable annuity payment amounts during periods of poor investment performance; (2) that can provide the annuitant with control of investments in the variable annuity, allowing the annuitant to shift investments among portfolios and other investment options; (3) that can provide the opportunity for increased annuity payment amounts during periods of favorable investment performance; (4) that can provide (in addition to annuity payments) full cash value liquidity by providing the annuitant with access to the full cash value of the variable annuity; (5) that can provide a death benefit for the annuitant's beneficiaries, allowing the annuitant's beneficiaries to receive the full cash value of the variable annuity as ongoing payments or as a lump sum; and (6) that can reduce the risk that the investment value of the variable annuity will be depleted by making annuity payments that are based on dated investment evaluations as a means of attempting to stabilize annuity payment amounts.

SUMMARY OF THE INVENTION

The primary object of the present invention is to overcome the deficiencies of the prior art described above by providing a system, method, and computer program product for providing stabilized annuity payments and control of investments in a variable annuity.

Another object of the present invention is to provide a system, method, and computer program product that provides a cushion against market volatility, maintaining stable annuity payment amounts during periods of poor investment performance.

Still another object of the present invention is to provide a system, method, and computer program product that provides the annuitant with control of investments in the variable annuity, allowing the annuitant to shift investments among portfolios and other investment options, while still providing a cushion against market volatility, maintaining stable annuity payment amounts during periods of poor investment performance and continuously providing liquidity.

Yet another object of the present invention is to provide a system, method, and computer program product that provides the opportunity for increased annuity payment amounts during periods of favorable investment performance Another object of the present invention is to provide a system, method, and computer program product that provides (in addition to annuity payments) full cash value liquidity by providing the annuitant with access to the full cash value of the variable annuity.

Still another object of the present invention is to provide a system, method, and computer program product that provides a death benefit for the annuitant's beneficiaries, allowing the annuitant's beneficiaries to receive the full cash value of the variable annuity as ongoing payments or as a lump sum.

Yet another object of the present invention is to provide a system, method, and computer program product that reduces the risk that the investment value of the variable annuity will be depleted by making annuity payments that are based on dated investment evaluations as a means of attempting to stabilize annuity payment amounts.

The present invention achieves these objects and others by providing a system, method, and computer program product for providing stabilized annuity payments and control of investments in a variable annuity, the system comprising a processor, a memory, and a computer program stored in the memory.

The computer program allocates the short and long term risks associated with an investment to the potential beneficiaries of the annuitant by controlling the allocation of assets between two investment pools. The annuitant pool is the pool on which annuity payments are based and the beneficiary pool contains assets designated for the beneficiaries upon the death of the annuitant, but that are used as a cushion to isolate the contents of the annuitant pool from fluctuations in value. The beneficiary pool can be initially funded with sufficient assets to minimize the likelihood of its depletion under fairly conservative estimates of market conditions. If the underlying investments perform poorly, assets from the beneficiary pool are reallocated to the annuity pool in order to maintain the existing annuity payment. Thus, for as long as the beneficiary pool is not depleted, the annuity payment is stabilized and will not decrease. If the underlying investments perform favorably, increasing in value, excess amounts above a set trigger level amount will be periodically transferred to the annuitant pool. As these gains are transferred to the annuity pool, the annuity payment amounts will be increased accordingly.

Contrary to the conventional balance of risks, wherein the risk-taker is also the benefit-receiver, the system, method, and computer program product of the present invention provides for the annuitant receiving the benefits of investment gains, while shifting losses to the annuitant's beneficiaries until the beneficiary pool is depleted.

Further features and advantages of the present invention, as well as the structure and operation of various embodiments of the present invention are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

In the following description, for purposes of explanation and not limitation, specific details are set forth, such as particular networks, systems, computers, terminals, devices, components, techniques, software products and systems, enterprise applications, operating systems, financial equations, financial formulas, financial algorithms, hardware, etc. in order to provide a thorough understanding of the present invention. However, it will be apparent to one skilled in the art that the present invention may be practiced in other embodiments that depart from these specific details. Detailed descriptions of well-known networks, systems, computers, terminals, devices, components, techniques, software products and systems, enterprise applications, operating systems, financial equations, financial formulas, financial algorithms, hardware are omitted so as not to obscure the description of the present invention.

This invention presents a process for reducing fluctuations in a series of scheduled payments from changes of value in the underlying principal amount. For ease of understanding, this invention is presented in the context of an annuity, wherein the scheduled payments are provided for the life of an annuitant, although the principles of this invention are not limited to annuities, nor to investment or insurance applications in general. Other applications of this invention will be evident to one of ordinary skill in the art in view of this disclosure. Note that the term annuity is used in the general sense, as a series of equal payments occurring at regular intervals, although this invention is not limited to equal payments, nor necessarily to regular intervals of payments.

Figure 1:
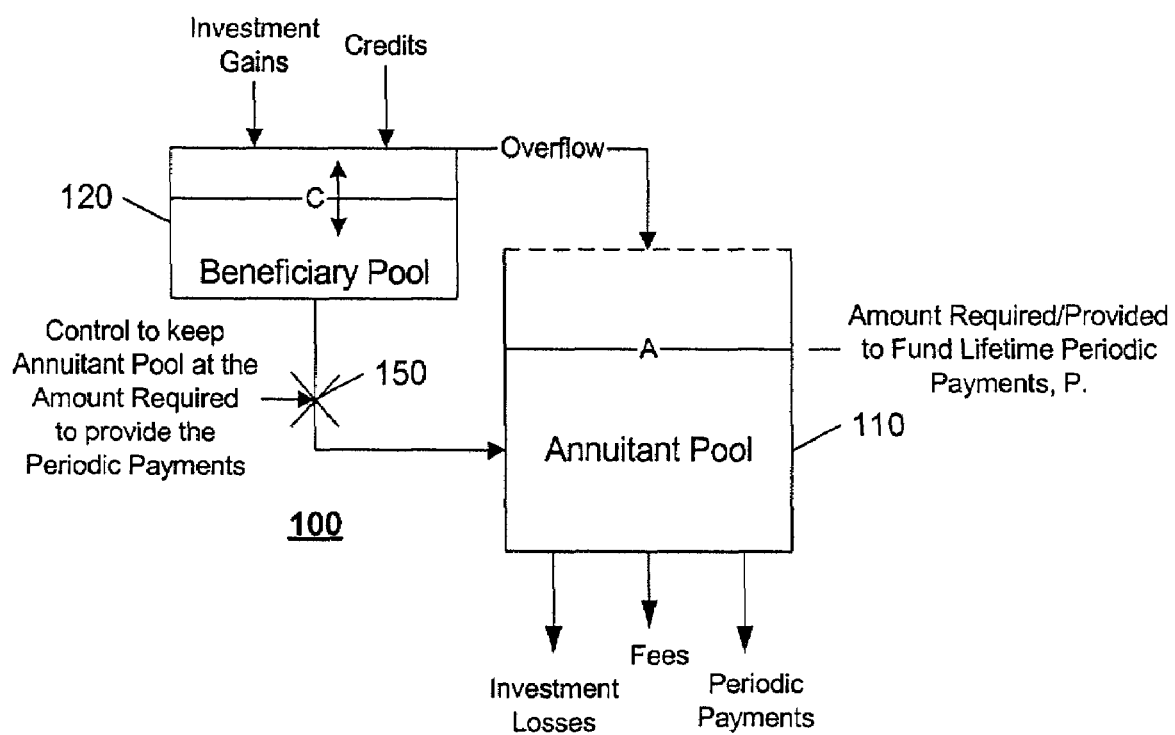
FIG. 1 is a representation in block diagram form of the structure and operation of a variable annuity product in accordance with the system, method, and computer program product of the present invention.

I. General Structure and Operation of a Variable Annuity According to the Present Invention FIG. 1 is representation in block diagram form of the structure and operation of a variable annuity product 100 in accordance with the system, method, and computer program product of the present invention. As illustrated, two pools are maintained: an annuitant pool 110, and a beneficiary pool 120. These pools are funded by an allocation of an initial principal amount between the two pools. In the example embodiment of the invention described herein, fifty percent (50%) of the funds are allocated to the beneficiary pool 120 and fifty percent (50%) are allocated to the annuitant pool 110. In principal, there are no limitations on how the initial principal amount can be allocated between the two pools. Typical allocations would be, for example, eighty percent (80%) of the assets in the annuitant pool and twenty percent (20%) in the beneficiary pool, eighty-five percent (85%) of the assets in the annuitant pool and fifteen percent (15%) in the beneficiary pool, or ninety percent (90%) in the annuitant pool and ten percent (10%) in the beneficiary pool. The allocation determines the degree of cushioning provided to the annuitant pool 110 by the beneficiary pool 120 due to subsequent changes to the value of the principal amount. In this example, the value of the principal is based on an investment of the principal in equities such as stocks, mutual funds, and the like, whose values change over time. The initial allocation provides an annuity amount A in the annuitant pool 110 and a cushion amount C in the beneficiary pool 120. The initial allocation can be stipulated by the financial institution offering the investment product, to thereby make the product most marketable, selected by the investor to derive the desired annuity payment and beneficiary benefits, or selected to provide the desired balance between the cushion to market volatility and greater payment amounts.

The initial scheduled payment amount P is computed as the series of scheduled payment amounts from the annuity amount A, using an assumed interest rate, or an assumed present-value rate. Techniques are common in the art for determining the present value of a series of scheduled payments. In the case of an annuity for the life of an annuitant, the payment amount is also based on the annuitant's age and applicable mortality factors, as described further below. In addition to providing a cushion, the cushion amount C in the beneficiary pool 120 corresponds to the present value of the amount that is paid to the beneficiaries of the annuity 100 at the death of the annuitant.

The cushion amount C is commonly expressed as a certain number of scheduled payments P from the beneficiary pool 120, using the same interest rate or present-value rate as is used for determining the payment amount P from the annuitant pool 110. In the present invention, the period during which payments to the beneficiaries are made is not a fixed time period, but varies based on the cushion amount C. Thus, for purposes of explaining the present invention, this period is referred to as an "inheritance period."

Thus, the initial allocation of a principal amount is partitioned into an annuity pool 110, that provides a series of payments P to the annuitant for the life of the annuitant, and a beneficiary pool 120, that provides a series of payments P to the beneficiaries for the inheritance period after the death of the annuitant. Alternatively, after the death of the annuitant, the beneficiaries may opt to receive a lump sum payment (in lieu of receiving a series of payments for the inheritance period). As will be discussed below, the number of scheduled payments and, therefore, the inheritance period may vary according to changes in the beneficiary pool and only become fixed (or "certain") upon the death of the annuitant(s).

Increases to the principal amount, such as investment gains or other credits, are illustrated as inflows to the principal, and are initially allocated to the beneficiary pool 120. Decreases in the principal amount, corresponding to each payment withdrawal, as well as decreases due to investment losses, administrative fees, and so on, are illustrated as outflows from the principal reducing the annuitant pool 110. In accordance with the present invention, a control 150 is provided to assure that the annuitant pool 110 contains the appropriate annuity amount A required to fund the remaining lifetime periodic payments of amount P. Specifically, the control 150 transfers the amounts of assets from the beneficiary pool 120 to the annuitant pool 110 as required to maintain the annuitant pool 110 at the annuity amount A.

In principle, if the rate of inflow is such that, after the outflow of each periodic payment, the amount in the annuitant pool 110 is equal to the present value of the future anticipated payments, the amount C in the beneficiary pool 120 will remain constant, and, correspondingly, the inheritance period will decrease exactly with the passage of time (i.e., the remaining inheritance period will decrease by exactly one month as exactly one month passes). If the rate of inflow is such that, after the outflow of each periodic payment, the amount in the annuitant pool 110 is less than the present value of the future anticipated payments, the control 150 causes the amount in the beneficiary pool 120 to decrease and the amount in the annuitant pool 110 to increase back up to the present value of the future anticipated payments. The decrease in the cushion amount C in the beneficiary pool 120 results in a corresponding decrease in the inheritance period. Thus, in accordance with the present invention, the risk of investment loss in the annuity is assumed, at least initially, by the beneficiaries.

If the beneficiary pool 120 is depleted, there will be no funds available to augment the annuitant pool 110, and any further losses will result in a decrease in the annuity amount A available to fund the payments P, thereby requiring a corresponding decrease in the payment amount P. In other words, for as long as funds remain in the beneficiary pool 120, the amount in the annuitant pool, and hence, the level of each of the periodic payments P, will be stabilized and will not decrease. In this manner, all investment losses are absorbed by the beneficiary pool 120, and not passed on to the annuitant pool 110, for as long as funds exist in the beneficiary pool 120. In addition, if the beneficiary pool 120 is depleted at the death of the annuitant, the beneficiaries will not receive any payments.

In accordance with another aspect of the present invention, cumulative investment gains over a specified amount (which may be constant or varying) are passed on to the annuitant. As illustrated in FIG. 1, "overflows" from the beneficiary pool 120—accumulated amounts over a specified limit, or "trigger level"—are added to the annuitant pool 110. When such overflow amounts are added to the annuitant pool 110, the amount in the pool 110 that is available for funding the periodic payments P increases, thereby allowing for an increase in the periodic payment amount P. Thereafter, the control 150 transfers amounts as required to maintain the annuitant pool 110 at this increased annuity amount A. Having set this increased annuity amount, the periodic payments will continue at the new amount P, for as long as funds are available to maintain this increased annuity amount. Subsequent overflows from the beneficiary pool 120 will likewise increase the annuity amount A in the annuitant pool 110, thereby introducing a corresponding increase in the periodic payment amount P. In other words, in accordance with this aspect of the invention, the annuitant pool 110 is maintained at the highest level thus far achieved, for as long as funds remain in the beneficiary pool 120 to maintain this level. In this manner, investment gains are reflected as increases in the annuitant's periodic payments P, while the beneficiary pool 120 prevents decreases in this peak payment amount for as long as sufficient funds remain in the beneficiary pool 120 to support this higher level of payments.

In accordance with another aspect of the present invention, the trigger level that defines an "overflow" from the beneficiary pool 120 is adjustable. For example, in a preferred embodiment, the beneficiary pool 120 is initially formed as an allocated percentage of the total principal (such as twenty percent of the total principal). The trigger level may be set as a percentage above of the cushion amount C so that an overflow is triggered when the assets allocated to the beneficiary pool 120 exceed the value of the cushion amount C by a predetermined percentage. If the beneficiary pool 120 and annuitant pool 110 are commingled assets (as discussed below), the beneficiary pool 120 may be calculated by subtracting the value of the annuitant pool 110 (i.e., the value of assets required to make the anticipated payments) from the total value of the principal. The trigger level may also be set at a fixed percentage greater than the total value of the principal (or current value of the investment) so that a predetermined percentage increase in the investment triggers a reallocation. When an overflow occurs and the program is designed to establish a new trigger level, the trigger level is established based on the new value of the beneficiary pool 120 (or total principal if based on the principal). Alternatively, the trigger level may be set to the cushion amount C so that any increase in the value of the assets over C triggers an overflow in which case a new trigger level would not need to be set.

Each time an overflow occurs, the value of the assets in the beneficiary pool can be scaled back to the trigger level, or to the initial allocation associated with the trigger level. Alternatively, the allocation between the annuitant pool 110 and the beneficiary pool 120 is restored to the original allocated percentages. In this latter manner, both the annuitant and the beneficiary benefit from investment gains, consistent with the original proportional allocation. Additionally, as the annuitant's requirements change, for example, because of lifestyle changes or other circumstances, the cushion amount and/or trigger level can be adjusted to provide, for example, increased payments P after a person's retirement, to reduce the beneficiary amounts after a dependent beneficiary, such as a child, becomes independent, or to otherwise modify the benefits due to other circumstances. Similarly, if allocation percentages are used rather than a fixed amount for the beneficiary pool, such percentages could be changed to meet changed needs.

A variety of techniques can be used to accomplish the allocation and flow of assets to effect the above described process of cushioning and, thus, stabilizing scheduled payments from relatively short-term fluctuations in the value of the underlying principal that funds the scheduled payments. Due to any of a variety of insurance, investment, or other regulations, a physical partitioning of funds or securities between two discrete pools may not be feasible or practical. Logically, however, such a partitioning into a beneficiary pool and an annuitant pool can be effected by alternative means, via, for example, a definition of terms that establishes such a logical partitioning. For example, the present value of a series of scheduled payments that are based on an assumed rate of return and an assumed or estimated number of payments can be calculated according to known techniques. If this present value differs from the value of the underlying resources (e.g., the investor's initial contribution), then the aforementioned definition of the present value of the scheduled payments effectively and logically partitions the underlying resources into the portion corresponding to the scheduled payments (the annuitant pool 110 in FIG. 1), and the remaining portion (beneficiary pool 120 in FIG. 1) corresponding to the difference between the value of the underlying resources and the present value of the scheduled payments.

Alternatively, defining an "inheritance period" for which the scheduled payments will continue after the annuitant's death effectively defines the initial beneficiary pool 120, given an assumed interest rate or present value factor, and thereby, defines the annuitant pool 110 as the remainder of the underlying resources (e.g., the investor's initial investment). The amount of the annuity payments are then computed by converting the annuitant pool 110 to a series of scheduled payments as is well known in the art. These and other methods of logically partitioning a resource between two pools, with or without physically partitioning the resource, will be evident to one of ordinary skill in the art in view of this disclosure. In addition, as would be evident to one skilled in the art, the computer system implementing the present invention stores the appropriate data to allow the computer program to manage the pools and allocations according to the design of the investment.

II. System Software

The system and method of the present invention are, preferably, implemented in a programmed general purpose computer running a computer program product comprised of software modules implementing the process of the present invention for providing stabilized annuity payments and control of investments in a variable annuity. The architecture, design, modules, and code of the software of the present invention could be implemented in a variety of ways and the manner in which it is implemented is largely a matter of design choice well within the ordinary skill level of those skilled in this art. Further, the data stored in memory and used by the computer program is dependent on the software implementation of the present invention. As would be evident to one skilled in the art, the results of the computations for implementing the present invention, such computed cushion amounts, annuity amounts, trigger levels, allocation ratios, asset values, and other information are stored in memory and retrieved from memory as needed.

Figure 2:
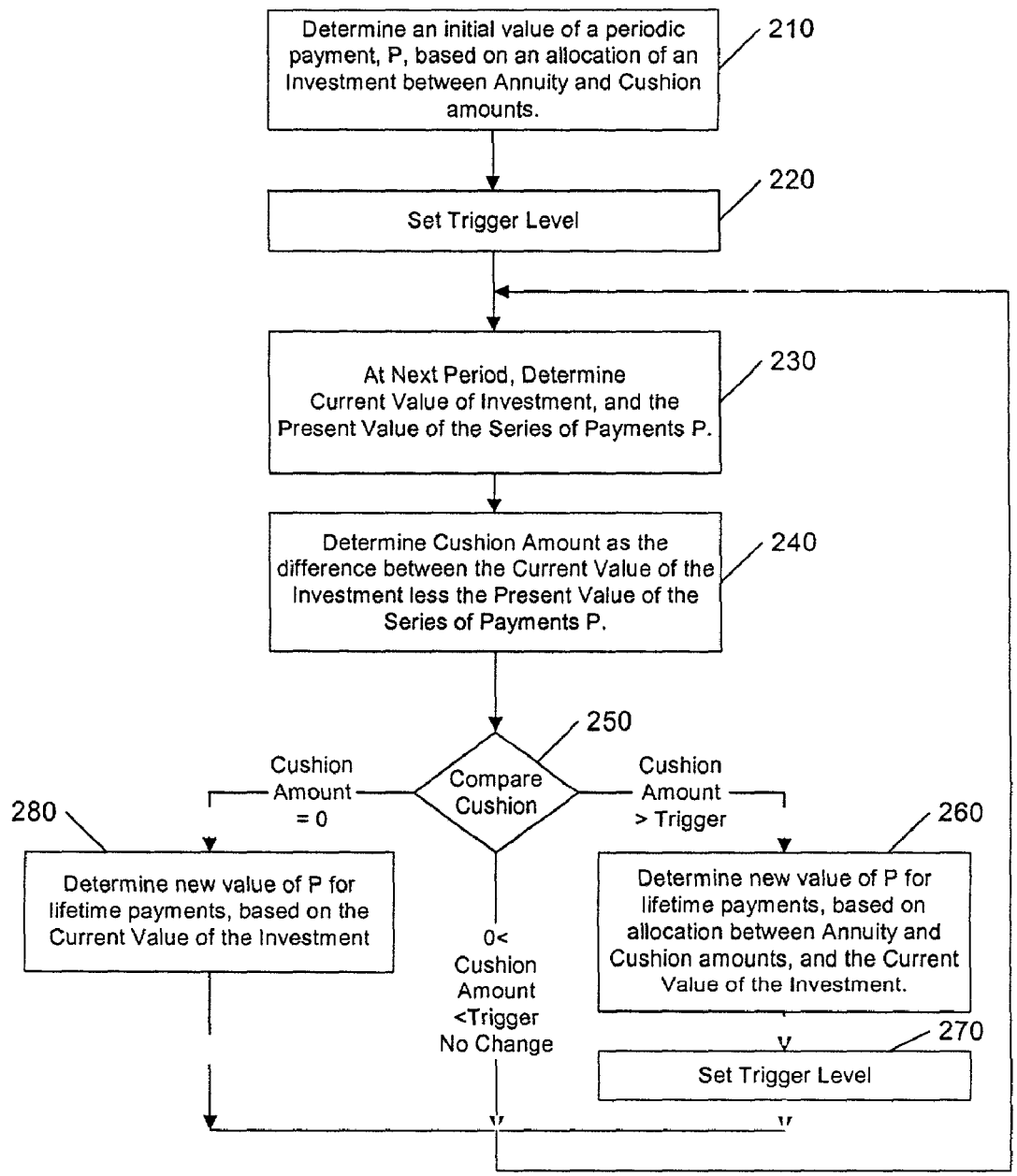
FIG. 2 is a flow diagram representing the method steps for determining a value of a periodic payment for a variable annuity product in accordance with the system, method, and computer program product of the present invention.

FIG. 2 is a flow diagram representing the method steps for determining a value of a periodic payment for a variable annuity product in accordance with the system, method, and computer program product of the present invention. As noted above, this invention is presented using the paradigm of an annuity, although one of ordinary skill in the art will recognize that the concepts presented in FIG. 2 are not limited to annuity calculations.

In the context of an annuity, the beneficiary pool 120 in FIG. 1 is a pool that is designated for the beneficiary at the death of the annuitant (if any assets remain), and is used to cushion the annuity payments against market volatility. Therefore, the amount of assets contained in the beneficiary pool 120 is termed the "cushion" amount. Likewise, the amount contained in the annuitant pool 110 of FIG. 1 is termed the "annuity" amount.

At step 210, an initial investment, or principal, is allocated between an annuity amount and a cushion amount according to predetermined allocation parameters such as fifty percent (50%) of the funds allocated to the beneficiary pool 120 and fifty percent (50%) to the annuitant pool 110. The periodic payment P that can be funded by this annuity amount is then determined. This determination is based on an assumed interest rate or present value factor, and an assumed or estimated number of payments. In a lifetime-based annuity, the estimated number of payments is based on the annuitant's age (potentially gender) and corresponding mortality statistics. If the annuity amount is A, the assumed interest rate is I, and the number of payments is N, the payment amount P satisfies the following equation:

$$A = \sum_{j=1}^{N} \frac{P}{(1+I)^j}. \quad (1)$$

For a lifetime annuity, the number of payments N is unknown, and equation (1) is reformed as:

$$A = \sum_{j=1}^{\omega} \frac{P * \prod_{k=0}^{j}(1-q_k)}{(1+I)^j}, \quad (2)$$

where $q_k$ is the probability of an annuitant's death within period k, based on the annuitant's age and other mortality factors, and $\omega$ is effectively infinity (a value at which $q_k$ is effectively unity). Equations (1) and (2) are common in the art, and other equations may be used to determine future payments based on a present amount, or to determine a present value of a set of future payments, with or without elements of uncertainty, such as an annuitant's life expectancy. Note that, as is known in the art, the interest rate I and the periods j and N must be consistent with each other. If the interest rate I is an annual percentage rate, and the periods j and N are months, either I or the exponent of the (1+I) term must be divided by 12, depending upon whether the interest rate is expressed as a simple percentage, or as the "APR" (Annual Percentage Rate), respectively. Other definitions and transformations are common in the art, including expressions for daily or continuous compounding of interest, and so on.

At step 220, a trigger value is set. This trigger value determines when an "overflow" occurs in the cushion amount as discussed below. Generally, this value is equal to or greater than the initially allocated cushion amount C. By providing a trigger above the cushion amount C, an overflow will not be triggered by slight changes to the cushion amount C. Other methods of reducing the occurrence of events because of minor transient changes are common in the art, such as hysteresis filtering, low-pass filtering, and other methods which may be employed to control the triggering of an overflow event.

The trigger level may be stipulated by the financial institution offering the investment product, selected by the investor to derive the desired annuity payment and beneficiary benefits, or selected to provide the desired balance between the cushion to market volatility and opportunity for increased payment amounts. In this example embodiment, the trigger value is set at a value that is twenty percent (20%) above the initial cushion amount C. In other words, an overflow occurs if the total value of the principal increases such that the new cushion amount C, which is the appreciated principal amount minus the annuity amount, is twenty percent greater than the initial cushion amount.

As discussed above, the trigger level may, optionally, be set to the cushion amount C. In this case, even small increases in the cushion amount C will result in a reallocation. Alternatively, the trigger level may be based on the principal as a predetermined threshold (e.g., percentage or fixed amount) above the existing principal. The characterization of the trigger (as being based on the cushion or principal) and its associated level and overflow computations are largely a matter of design choice and the various means for setting the trigger level will be evident to one of ordinary skill in the art in view of this disclosure.

At step 230, the current value of the total principal at the next time period is determined. This value is determined using conventional techniques. For example, if some or all of the principal is invested in equity assets, the value of each asset, such as its current stock market price, is used to determine the current value of the principal. Applied credits, increases in equity values, dividends received, and other increases are added to the principal. The withdrawal of the payment P, any applied fees, decreases in equity values, and other reductions are subtracted from the principal.

After allocating an amount equal to the current payment P to the annuitant out of the annuitant pool 110 (which may include implementing a payment to the annuitant), the amount A required to fund the remaining payments P (i.e., the present value of the remaining annuity payments) is determined. The amount A is reduced over its previous value because the number of payments are reduced by one or, in the case of a lifetime annuity, because the likelihood of the annuitant's death increases with each elapsed time period.

In this example embodiment, to isolate the annuity process from the investment process, the annuity is defined in terms of a number of "units" and a corresponding current value that is associated with each unit. For example, if an initial principal of $1000 is invested by purchasing 100 shares of an equity with a $10 share value, the annuity process is based on increases and decreases to the value of the units, and the current value is determined by multiplying the current number of shares by the current share value.

At step 240, the present value of the series of remaining annuity payments A is determined, which is subtracted from the total current value of the principal to determine the cushion amount C.

At step 250, the cushion amount is compared to the trigger level. If the cushion amount is above the defined trigger level, the principal is reallocated between the annuity amount A and cushion amount C, at step 260, using the currently defined allocation, which in this example embodiment is fifty percent (50%) of the funds allocated to the beneficiary pool 120 (cushion amount) and fifty percent (50%) to the annuitant pool 110. As noted above, filtering techniques may be used in step 250 to minimize the determination that the trigger level is exceeded based on a transient event. The allocation at step 260 generally corresponds to the initial allocation at step 210, appropriately scaled for the new principal amount, although as noted above, the allocation rules may be modified based on life style or other changes. Alternatively, and as discussed above, the reallocation could be triggered by an appreciation of the total principal to a predetermined amount (e.g., a percentage or fixed amount) as opposed to being a trigger relative to the cushion amount C.

Based on this new annuity amount A, a new periodic or lifetime payment amount P is determined that can be funded using the equations (1) or (2) as discussed above with regard to step 210.

If the cushion amount is above the defined trigger level and a reallocation is completed, the trigger level is adjusted at step 270, which in this example embodiment is set to a value equal to the total principal plus an amount equal to twenty percent (20%) of the newly established cushion amount. In a typical application, the trigger level is adjusted to be slightly greater than the new cushion amount, otherwise the process will continuously re-trigger a reallocation and redetermination of the payment amount P at each next period until the cushion amount drops below the trigger level. In some applications, such a continuous reallocation at each period may be warranted. Other methods of adjusting or regulating the trigger level, such as an inflation-dependent determination of the trigger level, can be used to provide other effects and realize other advantages as will be evident to one of ordinary skill in the art in view of this disclosure.

At step 250, if it is determined that the cushion amount C is less than or equal to zero, there are no longer assets available to maintain the annuity amount A. In this case, at step 280, the annuity amount A is set equal to the current value of the principal, and a corresponding payment amount P is redetermined using the process and equations (1) or (2) discussed above in connection with step 210 of the process. As noted above with regard to determining an overflow event, filtering techniques may be applied to prevent a determination of a zero-crossing event based on transient current values.

If, at step 250, it is determined that the cushion amount C is between zero and the trigger amount, no changes are made to the payment amount P. This maintains the payment amount P at the payment level corresponding to current the trigger level, as discussed above. If the principal amount decreases so that the annuity pool 110 shrinks (meaning that the cushion amount C is zero), the payment amount P will be reduced accordingly. Future increases in the principal amount are allocated solely as increases in the annuitant pool until the annuity amount is restored to its highest prior value so that the payment amount P is restored to its corresponding highest prior value prior to the cushion amount C having dropped to zero. Once the annuity amount is restored, further increases in the principal amount are allocated to the beneficiary pool resulting in increases in the cushion amount C. Other embodiments, however, could simply reallocate increases in the principal amount between the beneficiary pool 120 and the annuitant pool 110 according to the initial allocations or other predetermined allocations, or allocate increases to the beneficiary pool when the cushion amount C reaches zero.

Figure 3:
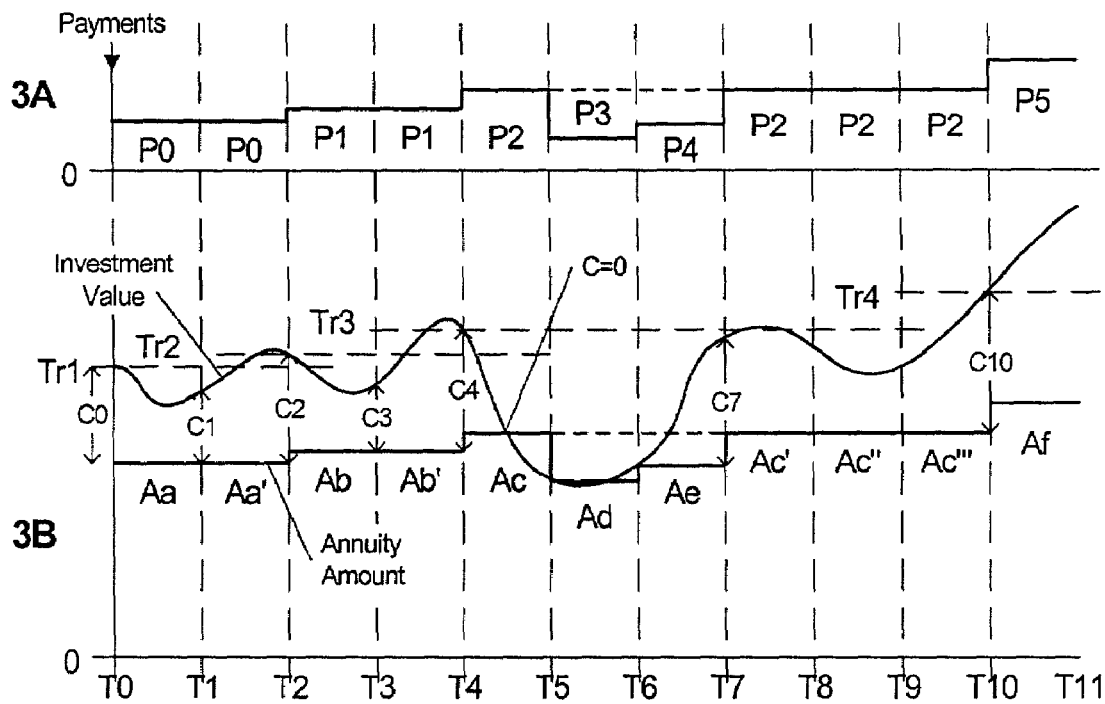
FIG. 3 is a timing diagram showing representative payments, investment values, annuity amounts, trigger levels, and cushion amounts at periodic time intervals for a variable annuity product in accordance with the system, method, and computer program product of the present invention.

III. Representative Example Variable Annuity Product According to the Present Invention FIG. 3 is a timing diagram showing representative payments, investment values, annuity amounts, trigger levels, and cushion amounts at periodic time intervals for a variable annuity product in accordance with the system, method, and computer program product of the present invention. In this example, the beneficiary pool and annuity pool are logically partitioned and the assets of the pools are commingled in investment(s). The investment value or total principal amount is illustrated as the curved line in the lower timing diagram 3B. At time T0, the investment is allocated into an annuity pool of amount Aa, and a beneficiary pool of cushion amount C0. A trigger level, Tr1, is set at the cushion amount C0 above the annuity amount Aa. For ease of reference, this trigger level Tr1 is defined in this example as a trigger level relative to the total investment value. The scheduled payment amount corresponding to this annuity amount Aa is illustrated as P0 in the upper timing diagram 3A. Note that the vertical scales of 3A and 3B are not the same as a payment amount P0 is generally a small fraction of the annuity amount Aa unless the annuity duration is small.

At time T1, the next scheduled evaluation time, the current value of the investment is determined, and a cushion amount C1 is determined, by subtracting the annuity amount Aa' that is required to fund continued payments of amount P0 from the value of the total investment. Note that Aa' will be slightly less than Aa because one payment P0 has been made, as discussed above. Note also that the investment value may exhibit a slight decrease as well as a result of the withdrawal of the payment P0, the assessment of fees, the allocation of credits, and other reductions. For ease of illustration and understanding, these minor discontinuities are not illustrated in FIG. 3. Note also that the particular time of issuing the payment P0 is not illustrated. Techniques are common in the art for determining the value of a payment on a particular date, relative to an evaluation date, which may be on a different date.

Because the amount C1 is positive, and the value of the investment is below the trigger level Tr1, the payment remains at P0 during the next interval T1-T2. Note that, in accordance with this invention, even though the investment value at T1 is less than the investment value at T0, the periodic payment does not decrease at T1. Instead, if the annuitant dies at T1, the beneficiaries, if they receive the lump sum, will receive the decreased amount C1, rather than the initial beneficiary amount C0. In this manner, as illustrated, a decrease in the investment value has no impact on the annuitant, but has a potential impact on the beneficiaries that is only realized upon the death of the annuitant.

At T2, the next scheduled evaluation time, the current value of the investment is again determined, and a new cushion amount C2 is determined by subtracting the annuity amount (slightly less than Aa', discussed above) required to fund continued payments of amount P0 from the value of the total investment.

Because the amount C2 is positive at T2, and the value of the investment is above the trigger level Tr1, an overflow event is triggered, and the total investment is reallocated. As noted above, in a preferred embodiment, the total investment is allocated to the annuity and cushion amounts using a specified proportion, or ratio. Therefore, this reallocation results in an increase in the annuity amount, as illustrated by Ab in FIG. 3. This new annuity amount Ab results in a new scheduled payment amount P1. A new trigger level, Tr2, is also set, in this example, according to the new total investment value at time T2.

At time T3, the next scheduled evaluation time, the current value of the investment is determined, and a cushion amount C3 is determined by subtracting the annuity amount Ab' that is required to fund continued payments of amount P1 from the total investment value. Because the amount C3 is positive, and the value of the investment is below the new trigger level Tr2, the payment remains at P1 during the subsequent interval.

At time T4, the investment value again triggers an overflow and reallocation, as discussed above with regard to time T2, and a new annuity amount Ac, payment amount P2, cushion amount C4, and trigger level Tr3 are established.

Between time T4 and T5, the value of the investment drops below the required annuity amount Ac, which is equivalent to the cushion amount C being depleted, as indicated by the "C=0" indicator in FIG. 3. Depending upon the choice of embodiments, this could trigger an immediate reevaluation of the annuity amount or, as illustrated in FIG. 3, could be ignored until the next scheduled evaluation period, T5. At T5, because the total value of the investment is less than the annuity amount Ac required to fund continued payments of P2, the cushion amount is set to zero, and the new annuity amount Ad is set equal to the total value of the investment. This decreased annuity amount Ad reduces the payment amount of P3. The trigger amount remains at Tr3.

At T6, in this example, the annuity amount Ae is reset to the current value of the investment, and a new periodic payment amount P4 is determined. The annuity amount and associated periodic payment amount will increase in response to increases in the total investment value until those values reach the values corresponding to the current trigger level Tr3. In other words, increases in the total investment are allocated to the annuity amount to increase the annuity amount to Ac (the annuity amount that was set when the investment value reached Tr3) to provide the periodic payment P2, before any funds are allocated to the cushion amount. Alternatively, a new trigger amount could be set at time T5, when the annuity amount decreased, and the payment could be held at the corresponding amount p3 until the new trigger level is exceeded, or until the investment value drops even further. These and other alternatives for dealing with the resetting of event triggers after the cushion amount is depleted will be evident to one of ordinary skill in the art in view of this disclosure.

At T7, the investment value exceeds the target annuity amount Ac, and, in this example, the process continues as from time T4, as if the devaluations at periods T5 and T6 had not occurred. That is, the annuity amount is restored to the level Ac (as it existed before the depletion of the cushion amount C) corresponding to the retained trigger level Tr3, and the payment amount of P2 is restored. Alternatively, if a new trigger had been set, at T6, and the investment value had exceeded this new trigger, an overflow event would have been triggered with a subsequent reallocation.

At T8 and T9, the investment value is between the annuity amount Ac and the trigger amount Tr3, and therefore no changes are made to the payment amount P2.

At T10, the investment value exceeds the trigger level Tr3, and an overflow event is triggered, as discussed above with regard to evaluation times T2 and T3. This produces a new annuity amount Af, and a corresponding new payment amount P5, a new cushion amount C10, and a new trigger level Tr4.

As can be seen from the payment flow of FIG. 3, the payment stream is substantially buffered from fluctuations in the value of the investment, and in particular from negative excursions in the value of the investment, except when the cushion amount is depleted.

The following are detailed specifications for two variable annuity products according to the present invention. In the two variable annuity products, the annuitant pool is controlled by an underlying schedule of units and the fluctuating value of those units, as defined in connection with the specifications for the two variable annuity products described hereinafter. However, the decision whether to implement this invention using units or dollars is largely a design choice. The operation and processing steps performed for these products are described with reference to annuity "units," as compared with dollar values. The structure and operation of these products is in accordance with the system, method, and computer program product of the present invention.

A. Adjustable Variable Immediate Annuity with a Variable Inheritance Period—Specification Notation and Definitions AIr—Benchmark Rate (annual)

$q_x$—monthly probability of death at age int(x) months $a_{xc}$—present value of 1 unit per month for life of annuitant age int(x) months with c month inheritance period. If c is an integer then $$a_{x:c} = \sum_{t=1}^{c} \frac{1}{(1+AIR)^{t/12}} + \sum_{t=c+1}^{\omega} \frac{\prod_{k=0}^{t-1}(1-q_{x+k})}{(1+AIR)^{t/12}}$$

where $\omega$ is the final age in the underlying mortality table (effectively infinite). If c is non-integral then $a_{xc} = a_{x:int(c)} + (c - int(c))*(a_{x\,int(c+1)} - a_{x.int(c)})$ $a_c$—present value of 1 unit per month for c months. If c is an integer then $$a_c = \sum_{t=1}^{c} \frac{1}{(1+AIR)^{t/12}}$$

otherwise if c is non-integral then $a_c = a_{int(c)} + (c - int(c))*(a_{int(c+1)} - a_{int(c)})$ I—Increase factor for determination of payout amounts Contract Definition (at Time t)

| | |
|---|---|
| Inheritance Period | $c_t$ (in months) |
| Scheduled Units | $U_t^k$ (for sub-account k) |
| Payout in month int(t) | $P_t$ (in currency) |
| Contract Value (units) | $AV_t^k$ (for sub-account k) |
| Cash Value (units) | $CV_t^k$ (for sub-account k) |
| Trigger | maxSV (in currency) |

Issue Processing

1. Allocate net premium (NP) (i.e. gross premium (GP) less premium tax) among the sub-accounts (k) according to specified allocation rates ($W^k$) i.e.

$NP^k = W^k \cdot GP \cdot (1 - \text{taxrate})$.

2. Determine the initial Inheritance Period $c_0$ such that $$\frac{a_{x'c_0}}{a_{c_0}} = \frac{\sum_k NP^k}{\max SV}$$

except that in certain tax qualified situations the Inheritance Period will be limited to IRS life expectancy.

3.
4. For each sub-account determine AV, the initial number of scheduled units and CV such that $$AV_0^k = \frac{NP^k}{UV_0^k}, \quad U_0^k = \frac{AV_0^k}{a_{x'c_0}}, \quad CV_0^k = a_{c_0} \cdot U_0^k$$

5. Determine the amount of the first payment (due on annuity date)

$$P_1 = \sum_k U_0^k \cdot UV_0^k$$

Monthly Processing Date/Partial Surrender Processing

1. Let t be as of the current monthly processing date and let t' be as of the later of the previous monthly processing date and the last transfer date.
2. For each sub-account determine the Longevity Credit (units)

$$LC_t^k = \frac{q_{x+t-1}}{1 - q_{x+t-1}} \cdot [AV_{t'}^k - CV_{t'}^k]$$

3. For each sub-account. determine the new Contract Value (units)

$$AV_t^k = \max\left(\frac{a_{x+t0} \cdot U_{t'}^k}{(1+AIR)^{1/12}},\ AV_{t'}^k + LC_t^k - \frac{P_t \cdot U_{t'}^k}{\sum_m U_{t'}^m \cdot UV_t^m}\right)$$

4. Determine $c_t$ as the solution of $$a_{x+t \cdot c_t} = \frac{(1+AIR)^{1/12} \cdot \sum_k AV_t^k \cdot UV_t^k}{\sum_k U_{t'}^k \cdot UV_t^k}$$

5. Determine the Surrender Value (in currency)

$$SV = \frac{a_{c_t} \sum_k U_{t'}^k \cdot UV_t^k}{(1+AIR)^{1/12}}$$

6. If $$0 < SV \leq \max SV \quad set\, U_t^k = \frac{U_{t'}^k}{(1+AIR)^{1/12}}$$

for all k and set $P_{t+1} = P_t$ else if $$SV = 0 \text{ set } U_t^k = \frac{U_{t'}^k}{(1+AIR)^{1/12}}$$

for all k, and set $P_{t+1} = \sum_k U_t^k \cdot UV_t^k$ else if SV>max SV set $c_t$ such that $$\frac{\sum_k AV_t^k \cdot UV_t^k}{\max SV} = \frac{a_{x+tc_t}}{a_{c_t}}, \text{ set } U_t^k = \frac{AV_t^k}{a_{x+t \cdot c_t}}$$

for all k and $$\text{set } P_{t+1} = P_t + I \cdot \sum_k \left( U_t^k - \frac{U_{t'}^k}{(1+AIR)^{1/2}} \right) \cdot UV_t^k$$

7. For each sub-account, determine the Cash Value (units) $CV_t^k = U_t^k \cdot a_{c_t}$
8. If there is a request for the partial surrender of an amount PS where $0 < PS \leq \max PS$ then let $$f = 1 - \frac{PS}{\sum_k CV_t^k \cdot UV_t^k}$$

and adjust the previously determined results as follows $U_t^k = f \cdot U_t^k, AV_t^k = f \cdot AV_t^k, CV_t^k = f \cdot CV_t^k,$
$\max SV = f \cdot \max SV \text{ and } P_{t+1} = f \cdot P_{t+1}$ Surrender Processing
1. Let t be as of the surrender date and t' be as of the later of the previous monthly processing date and the last transfer date.
2. Determine the surrender benefit as $$SB = \sum_k CV_{t'}^k \cdot UV_t^k - P_{t+1}$$

Annuitant Death Processing (Lump Sum)
1. Let t be as of the claim date and t' be as of the later of the previous monthly processing date and the last transfer date.
2. Determine the death benefit as $$DB = \sum_k CV_{t'}^k \cdot UV_t^k - P_{t+1}$$

Transfer Processing
1. Let t be as of the current transfer date, let t' be as of the later of the previous monthly processing date and the last transfer date and let t" be as of the previous monthly processing date.
2. Allocate specified portions ($W_1$) of the amounts in a group of sub-accounts ($S_1$) to a second group of sub-accounts ($S_2$) according to a specified weighting $$\left( W_2 \text{ where } 1 = \sum_{k \in S_2} W_2^k \right).$$

3. Determine the amount to be reallocated $$A = \sum_{k \in S_1} W_1^k \cdot AV_{t'}^k \cdot UV_t^k$$

4. For each sub-account determine the new Contract Values (units)

$$AV_t^k = AV_{t'}^k - \left\{ \begin{array}{ll} W_1^k \cdot AV_{t'}^k & k \in S_1 \\ 0 & k \notin S_1 \end{array} \right\} + \left\{ \begin{array}{ll} \frac{W_2^k \cdot A}{UV_t^k} & k \in S_2 \\ 0 & k \notin S_2 \end{array} \right\}$$

5. For each sub-account determine the new scheduled units $$U_t^k = \frac{AV_t^k}{a_{x+t'' \cdot c_{t''}}}$$

6. For each sub-account, determine the new cash value (units) $CV_t^k = U_t^k \cdot a_{c_t}''$ B. Adjustable Variable Immediate Annuity with a Variable Inheritance Period and Guaranteed Minimum Payout—Specification Notation and Definitions
Air—Benchmark Rate (annual)
$q_x$—monthly probability of death at age int(x) months
$a_{xc}$—present value of 1 unit per month for life of annuitant age int(x) months with c month inheritance period. If c is an integer then $$a_{x:c} = \sum_{t=1}^c \frac{1}{(1+AIR)^{t/12}} + \sum_{t=c+1}^\omega \frac{\prod_{k=0}^{t-1}(1-q_{x+k})}{(1+AIR)^{t/12}}$$

where $\omega$ is the final age in the underlying mortality table (effectively infinite). If c is non-integral then $a_{xc} = a_{x:int(c)} + (c-int(c))*(a_{x:int(c+1)} - a_{x:int(c)})$ $a_c$—present value of 1 unit per month for c months. If c is an integer then $$a_c = \sum_{t=1}^c \frac{1}{(1+AIR)^{t/12}}$$

otherwise if c is non-integral then $a_c = a_{int(c)} + (c-int(c))*(a_{int(c+1)} - a_{int(c)})$ I—Increase factor for determination of payout amounts. For this product, the factor is 3.0.
GP—Guaranteed Payment Amount Contract Definition (at Time t)

| | |
|---|---|
| Inheritance Period | $c_t$ (in months) |
| Scheduled Units | $U_t^k$ (for sub-account k) |
| Payout in month int(t) | $P_t$ (in currency) |
| Contract Value (units) | $AV_t^k$ (for sub-account k) |

| | |
|---|---|
| Cash Value (units) | $CV_t^k$ (for sub-account k) |
| Trigger | maxSV (in currency) |

Issue Processing

1. Allocate net premium (NP) (i.e. gross premium (P) less premium tax) among the sub-accounts (k) according to specified allocation rates ($W^k$) i.e. $NP^k = W^k \cdot P \cdot (1 - \text{taxrate})$.
2. Determine the initial Inheritance Period $c_0$ such that $$\frac{a_{x \cdot c_0}}{a_{c_0}} = \frac{\sum_k NP^k}{\text{maxSV}}$$

except that in certain tax qualified situations the Inheritance Period will be limited to IRS life expectancy.

3. For each sub-account determine A V, the initial number of scheduled units and CV such that $$AV_0^k = \frac{NP^k}{UV_0^k}, \quad U_0^k = \frac{AV_0^k}{a_{x \cdot c_0}}, \quad CV_0^k = a_{c_0} \cdot U_0^k$$

4. Determine the amount of the first and guaranteed payment $$P_1 = GP = \sum_k U_0^k \cdot UV_0^k$$

Monthly Processing Date/Partial Surrender Processing

1. Let t be as of the current monthly processing date and let t' be as of the later of the previous monthly processing date and the last transfer date.
2. For each sub-account determine the Longevity Credit (units)

$$LC_t^k = \frac{q_{x+t-1}}{1 - q_{x+t-1}} \cdot [AV_{t'}^k - CV_{t'}^k]$$

3. For each sub-account. determine the new Contract Value (units)

$$AV_t^k = \max\left(\frac{a_{x+t0} \cdot U_{t'}^k}{(1+AIR)^{1/12}}, AV_{t'}^k + LC_t^k - \frac{P_t \cdot U_{t'}^k}{\sum_m U_{t'}^m \cdot UV_t^m}\right)$$

4. Determine $c_t$ as the solution of $$a_{x+t:c_t} = \frac{(1+AIR)^{1/12} \cdot \sum_k AV_t^k \cdot UV_t^k}{\sum_k U_{t'}^k \cdot UV_t^k}$$

5. Determine the Surrender Value (in currency)

$$SV = \frac{a_{c_i} \sum_k U_{t'}^k \cdot UV_t^k}{(1+AIR)^{1/12}}$$

6. If $$0 < SV \leq \text{maxSV} \quad \text{set} U_t^k = \frac{U_{t'}^k}{(1+AIR)^{1/12}}$$

for all k and set $P_{t+1} = P_t$ else if $$SV = 0 \quad \text{set} U_t^k = \frac{U_{t'}^k}{(1+AIR)^{1/12}}$$

for all k, and $$\text{set } P_{t+1} = \min\left(GP, \sum_f U_t^k \cdot UV_t^k\right)$$

else if SV>max SV set $c_i$ such that $$\frac{\sum_k AV_t^k \cdot UV_t^k}{\text{maxSV}} = \frac{a_{x+t \cdot c_i}}{a_{c_t}}, \text{ set } U_t^k = \frac{AV_t^k}{a_{x+t \cdot c_t}}$$

for all k and $$\text{set } P_{t+1} = P_t + I \cdot \sum_k \left(U_t^k - \frac{U_{t'}^k}{(1+AIR)^{1/12}}\right) \cdot UV_t^k$$

7. For each sub-account. determine the Cash Value (units) $CV_t^k = U_t^k \cdot a_{c_i}$
8. If there is a request for the partial surrender of an amount PS where $0 < PS \leq \text{maxPS}$ then let $$f = 1 - \frac{PS}{\sum_k CV_t^k \cdot UV_t^k}$$

and adjust the previously determined results as follows $U_t^k = f \cdot U_t^k, AV_t^k = f \cdot AV_t^k, CV_t^k = f \cdot CV_t^k, \text{maxSV} = f \cdot \text{maxSV},$
$GP = f \cdot GP \text{ and } P_{t+1} = f \cdot P_{t+1}$ Surrender Processing 1. Let t be as of the surrender date and t' be as of the later of the previous monthly processing date and the last transfer date.

2. Determine the surrender benefit as $$SB = \sum_k CV_{t'}^k \cdot UV_t^k - P_{t+1}$$

Transfer Processing
1. Let t be as of the current transfer date, let t' be as of the later of the previous monthly processing date and the last transfer date and let t" be as of the previous monthly processing date.
2. Allocate specified portions ($W_1$) of the amounts in a group of sub-accounts ($S_1$) to a second group of sub-accounts ($S_2$) according to a specified weighting $$\left( W_2 \text{ where } 1 = \sum_{k \in S_2} W_2^k \right).$$

3. Determine the amount to be reallocated $$A = \sum_{k \in S_1} W_1^k \cdot AV_{t'}^k \cdot UV_t^k$$

4. For each sub-account determine the new Contract Values (units)

$$AV_t^k = AV_{t'}^k - \begin{Bmatrix} W_1^k \cdot AV_{t'}^k & k \in S_1 \\ 0 & k \notin S_1 \end{Bmatrix} + \begin{Bmatrix} \dfrac{W_2^k \cdot A}{UV_t^k} & k \in S_2 \\ 0 & k \notin S_2 \end{Bmatrix}$$

5. For each sub-account determine the new scheduled units $$U_t^k = \frac{AV_t^k}{a_{x+t''c_{t''}}}$$

6. For each sub-account, determine the new cash value (units)
$CV_t^k = U_t^k \cdot a_{c_{t''}}$ Annuitant Death Processing (Lump Sum)
1. Let t be as of the claim date and t' be as of the later of the previous monthly processing date and the last transfer date.
2. Determine the death benefit as $$DB = \sum_k CV_{t'}^k \cdot UV_t^k - P_{t+1}$$

IV. System Architecture

Figure 4:
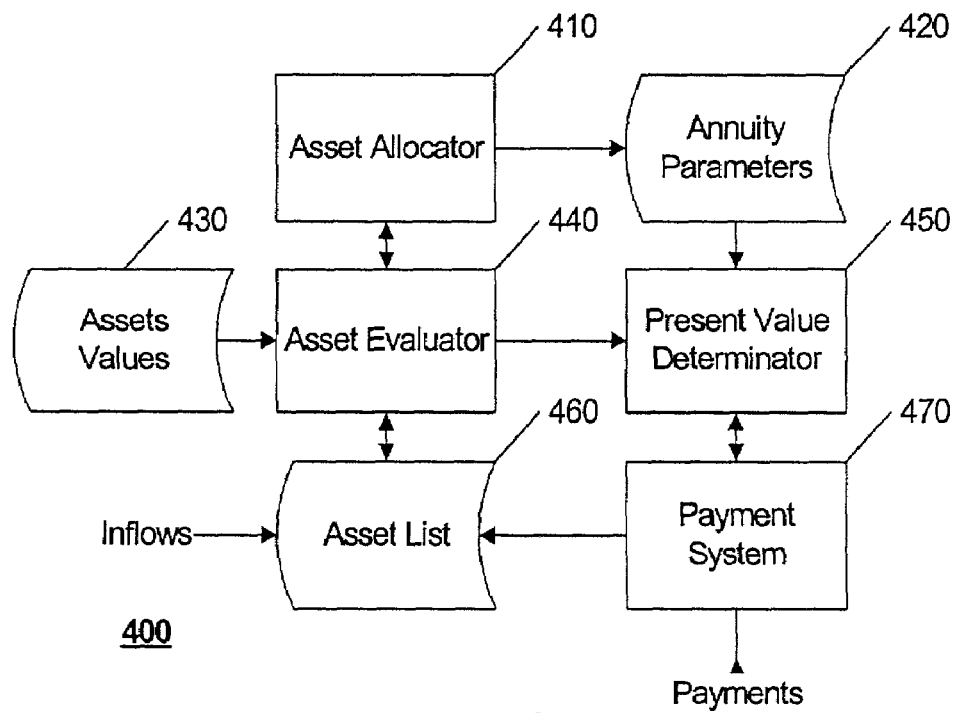
FIG. 4 is a functional block diagram of the architecture for the system, method, and computer program product of the present invention.

FIG. 4 is a functional block diagram of the architecture for the system, method, and computer program product of the present invention. Referring to FIG. 4, the architecture of a system 400 according to the present invention is shown. An asset list 460 contains an identification of the assets comprising the investment(s). The asset list 460 is illustrated as a single item in FIG. 4, although it may actually comprise a collection of sub-lists, investment products, and/or accounts that are associated with the investment(s). An asset evaluator 440 determines the current value of the investment(s), via access to a source of current asset values 430. These current asset values 430 may be locally available, or may be obtained via access to one or more remote sites, such as an Internet, intranet, or private access site or system that contains the current price of equities listed on one or more stock exchanges. As noted above, the asset evaluator 440 may include one or more filter processes to provide an estimate of the value of the assets that minimizes transient peaks or lows.

An asset allocator 410 effects the asset allocation and management discussed above with reference to FIGS. 1 and 2, and adjusts the annuity amount, dependent upon the total investment value. Initially, the annuity amount is determined as a given percentage of the total investment, and thereafter adjusted only if the total investment value exceeds a trigger value, or is less than the annuity amount, as described above. The annuity amount and other related parameters are included in a set of annuity parameters 420. The annuity parameters 420 include an assumed interest rate, or present value factor, and the number of scheduled payments, or parameters that can be used to calculate or estimate the number of payments. For example, the parameters of a life annuity include the age(s) of the annuitant(s), appropriate mortality parameters, and other data. The annuity parameters 420 also include details such as the particular day of the month that the payment is scheduled and other information to effect the annuity.

A present value determinator 450 determines an annuity amount, based on the periodic payment and the aforementioned annuity parameters 420. As noted above, a variety of techniques for computing a present value of a series of payments are common in the art. A payment system 470 effects each payment to the annuitant, and effects a reduction in the asset list corresponding to this payment. The annuity payments cause a reduction in the value of assets, based on the current value of the assets and the current value of the actual payment. In a straightforward embodiment of this invention, all of the assets are proportionately reduced. Alternatively, different schemes can be used to prioritize the disposition of assets in response to each payment using, for example, professionally provided 'hold' v. 'sell' recommendations, or other schemes. In like manner, inflows are also distributed to the investments of the asset list, and any of a variety of techniques can be used to determine which particular assets are added to the investment principal or to which investment the new inflows are allocated.

The processing system 400 may be embodied as a combination of hardware and software elements, and may be configured as a stand-alone system or as a distributed system, or any combination in between. Collectively, the elements 420, 430, and 460 can be stored in a memory that is associated with the processing system 400. The elements 410, 440, 450, an 470 can be considered elements of a processor, or software modules, that are associated with the processing system 400, but need not be collocated, nor exclusive to the processing system 400. For example, the payment system 470 may include a third party service for actually distributing the payments and the present value determinator 450 may be located on a generally accessible computer, whereas the remainder of the system may be located on a system that is specifically designed to effect the asset allocation process. Similarly, some or all of the elements of the system 400 may be located on a network, including the Internet. In such an embodiment, the investor or annuitant may be provided on-line access to the asset list 460 to monitor his or her investment, and may also be provided options for modifying the list via on-line trades, or other control means.

At the death of the annuitant, the cushion amount in the beneficiary pool 120 may be paid to the beneficiaries as fixed or variable payments until the assets in the beneficiary pool are depleted. In addition, the cushion amount in the beneficiary pool 120 may be paid to the beneficiaries for a fixed time period with a payment that is based on the value of the beneficiary pool at the annuitant's death. In addition, as with all of these investment products, the annuity could provide a guaranteed minimum payment for which the financial services institution offering the product would charge a fee.

V. System Hardware

Figure 5:
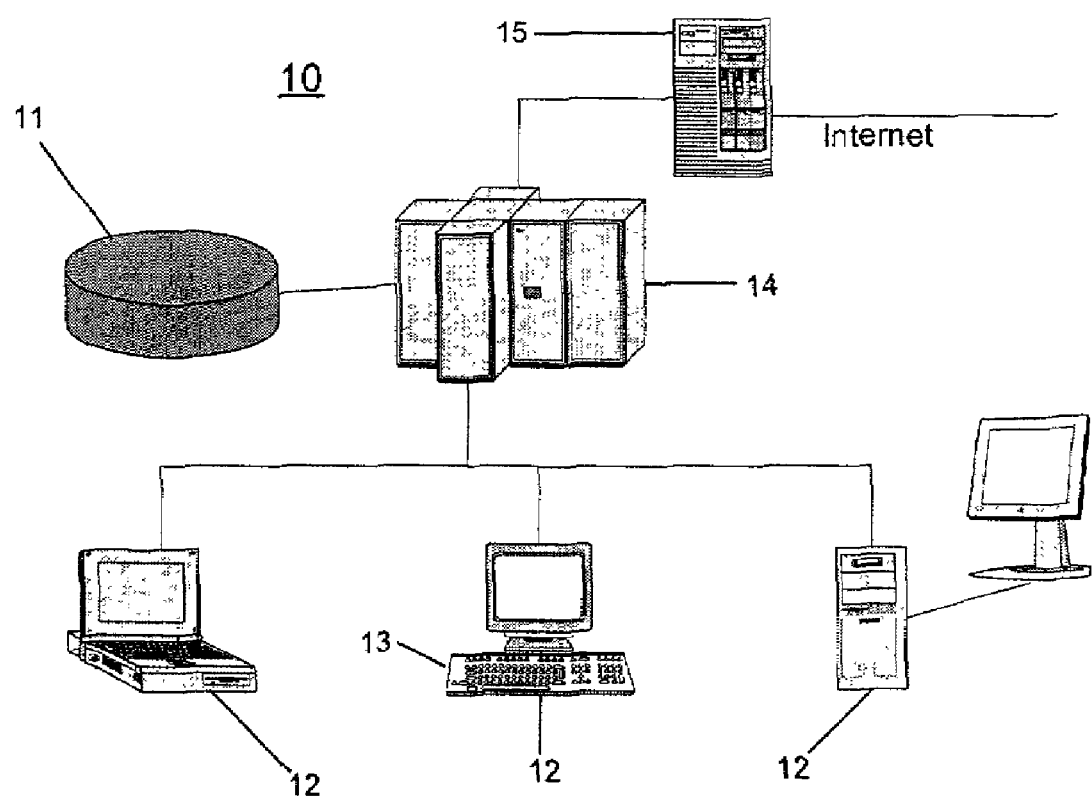
FIG. 5 is an illustration of a representative computer system for implementing the system, method, and computer program product of the present invention.

FIG. 5 is an illustration of a representative computer system for implementing the system, method, and computer program product of the present invention. Referring to FIG. 5, as described above, the process for stabilizing annuity payments and controlling investments in a variable annuity of the present invention may be advantageously implemented using a computer program executing on a computer system 10 having a processor or central processing unit 14, such as, for example, an IBM AS/400, having a memory 11, such as, for example, a hard drive, RAM, ROM, a compact disc, magneto-optical storage device, and/or fixed or removable media, having a one or more user interface devices 12, such as, for example, computer terminals, personal computers, laptop computers, and/or handheld devices, with an input means, such as, for example, a keyboard 13, mouse, pointing device, and/or microphone. The computer program is stored in memory 11 along with various other data including investor information, investment data, account information, asset information, allocation of investor assets, transaction cost data, fee data, mortality tables, communication information, and other parameters and data necessary to implement the method of the present invention.

In addition, the computer system 10 is coupled to a computer network, which may also be communicatively coupled to the Internet and/or other computer network to facilitate the buying and selling of investments electronically through an electronic communications network (ECN) such as, for example, Island (ISLD); Instinet (INCA); Terranova (TNTO); Attain (ATTN); Bloomberg Tradebook (BTRD); Spear, Leads, & Kellogg (REDI); and NASDAQ.

Optionally, information and other data including investor information, investment data, account information, asset information, allocation of investor assets, transaction cost data, fee data, communication information, and other parameters and data necessary to implement the method of the present invention could be stored externally of the system 10 and received through the Internet or other communication network in a manner well-known in the art for processing by the system 10. Also, the system software for implementing the method of the present invention could be implemented, wholly or partly, on a personal computer, laptop computer, handheld device, or like communication device or appliance for performing the processing steps of the present invention. The computer system 10 of the present invention may also include a web server 15.

The foregoing merely illustrates the principles of the invention. It will thus be appreciated that those skilled in the art will be able to devise various arrangements which, although not explicitly described or shown herein, embody the principles of the invention and are thus within its spirit and scope.

The computer program and software modules of the system, method, and computer program product of the present invention can be implemented using any operating system, and associated hardware including, but not limited to, Unix, Linux, VMS, IBM, Microsoft Windows NT, 95, 98, 2000, ME, and XP, Palm OS, Microsoft Windows CE and the like.

The systems, processes, and components set forth in the present description may be implemented using one or more general purpose computers, microprocessors, or the like programmed according to the teachings of the present specification, as will be appreciated by those skilled in the relevant art(s). Appropriate software coding can readily be prepared by skilled programmers based on the teachings of the present disclosure, as will be apparent to those skilled in the relevant art(s). The present invention thus also includes a computer-based product which may be hosted on a storage medium and include instructions that can be used to program a computer to perform a process in accordance with the present invention. The storage medium can include, but is not limited to, any type of disk including a floppy disk, optical disk, CDROM, magneto-optical disk, ROMs, RAMs, EPROMs, EEPROMs, flash memory, magnetic or optical cards, or any type of media suitable for storing electronic instructions, either locally or remotely.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

While a preferred embodiment of the present invention has been described above, it should be understood that it has been presented by way of example only, and not limitation. Thus, the breadth and scope of the present invention should not be limited by the above described exemplary embodiment.

For example, in the illustrated examples, the annuity amount is increased when the trigger level is exceeded, or decreased when the cushion amount is depleted. Alternatively, the annuity term—i.e., the number of scheduled annuity payments—could be increased or decreased, in the case of a known period of annuity payments. Also, consistent with 'guarantees' that are offered by annuity providers, the variable annuity of this invention can be configured to provide a minimum payment amount, regardless of the value of the investment. Conceptually, such a guarantee can be viewed as a 'guarantee pool' that supplies the annuitant pool as required when the beneficiary pool is depleted, to maintain the annuity pool at the minimum amount required to fund the minimum payment amount. Consistent with the assumed risk of this guarantee, the provider of the annuity may restrict the investment options provided to the investor when such a guarantee is offered. Also, consistent with other investment plans, the variable annuity of this invention may also be configured to allow subsequent contributions by the annuitant or the investor, as additional inflows to the total investment value. These and other system configuration and optimization features will be evident to one of ordinary skill in the art in view of this disclosure, and are included within the scope of the following claims.

Obviously, numerous modifications and variations of the present invention are possible in light of the above teachings. It is therefore to be understood that within the scope of the appended claims, the invention may be practiced otherwise than as specifically described herein.

What is claimed is:

1. A method of managing assets for stabilizing payment amounts in a series of anticipated periodic payments over a time period using a computer having a memory, the method comprising the steps of:

storing information relating to said assets and said series of anticipated periodic payments in memory;

determining an initial value of said assets;

defining a first pool by allocating a portion of said assets to said first pool having a first value representing an initial present value of the anticipated periodic payments;

defining a second pool by allocating a portion of said assets to said second pool having a second value representing the initial value of said assets less said first value;

at periodic intervals over the time period:
- determining a third value representing a subsequent value of the assets in said first pool; and
- comparing said third value to a fourth value representing a present value of the remaining anticipated periodic payments; and when said third value is less than said fourth value, reallocating a portion of said assets from said second pool to said first pool so that said first asset pool has a new value representing said fourth value;

wherein:
- the anticipated periodic payments are paid to an annuitant; and
- said second pool includes assets designated for at least one beneficiary; and wherein reallocating a portion of said assets from said second pool results in a decrease in the value of said assets designated for said at least one beneficiary.

2. A method of managing assets for stabilizing payment amounts in a series of anticipated periodic payments over a time period using a computer having a memory, the method comprising the steps of:

storing information relating to said assets and said series of anticipated periodic payments in memory;

determining an initial value of said assets;

defining a first pool by allocating a portion of said assets to said first pool having a first value representing an initial present value of the anticipated periodic payments;

defining a second pool by allocating a portion of said assets to said second pool having a second value representing the initial value of said assets less said first value;

at periodic intervals over the time period:
- determining a third value representing a subsequent value of the assets in said first pool; and
- comparing said third value to a fourth value representing a present value of the remaining anticipated periodic payments; and when said third value is less than said fourth value, reallocating a portion of said assets from said second pool to said first pool so that said first asset pool has a new value representing said fourth value;

wherein the payment amount is reduced only when said second value is substantially zero.

3. A method for managing assets for stabilizing payment amounts in a series of anticipated periodic payments over a time period, the method comprising the steps of:

allocating the assets into a first pool and a second pool;

establishing a first payment amount;

determining a first trigger value;

assessing a current value of the assets; and reallocating assets from said second pool to said first pool to increase the first payment amount to a second payment amount in response to said current value being greater than said first trigger value;

wherein:
- the anticipated periodic payments are paid to an annuitant; and
- said second pool contains assets designated for at least one beneficiary; and wherein reallocating from said second pool to said first pool results in a decrease in the value of said assets designated for said at least one beneficiary.

4. A method for managing assets for stabilizing payment amounts in a series of anticipated periodic payments over a time period, the method comprising the steps of:

allocating the assets into a first pool and a second pool;

establishing a first payment amount;

determining a first trigger value;

assessing a current value of the assets; and reallocating assets from said second pool to said first pool to increase the first payment amount to a second payment amount in response to said current value being greater than said first trigger value;

wherein the assets assessed are the assets allocated into said second pool; and wherein the payment amount is reduced only when said current value of said assets is substantially zero.

* * * * *